(12) United States Patent　　(10) Patent No.: US 7,196,638 B2
Sabatino　　(45) Date of Patent: *Mar. 27, 2007

(54) EMBEDDED DIGITIZATION SYSTEM

(75) Inventor: Anthony Edward Sabatino, Albuquerque, NM (US)

(73) Assignee: Honeywell International, Inc., Morristown, NJ (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/892,835

(22) Filed: Jul. 15, 2004

(65) Prior Publication Data

US 2005/0017877 A1　　Jan. 27, 2005

Related U.S. Application Data

(63) Continuation-in-part of application No. 09/590,085, filed on Jun. 7, 2000, now Pat. No. 6,765,498.

(51) Int. Cl.
*G08B 21/00* (2006.01)

(52) U.S. Cl. ............ 340/945; 340/988; 340/990; 342/13; 342/32; 342/61; 375/219; 370/254; 455/84; 455/140; 455/349; 701/200

(58) Field of Classification Search ............ None
See application file for complete search history.

(56) References Cited

U.S. PATENT DOCUMENTS

| 5,117,422 | A | 5/1992 | Hauptschein et al. |
|---|---|---|---|
| 5,691,903 | A | 11/1997 | Racette, III |
| 5,719,582 | A | 2/1998 | Gray |
| 5,798,726 | A | 8/1998 | Schuchman et al. |
| 5,883,586 | A | 3/1999 | Tran et al. |
| 6,002,363 | A | 12/1999 | Krasner |
| 6,018,625 | A | 1/2000 | Hayball et al. |
| 6,055,478 | A | 4/2000 | Heron |
| 6,072,994 | A | 6/2000 | Phillips et al. |
| 6,157,891 | A | 12/2000 | Lin |
| 6,262,679 | B1 | 7/2001 | Tran |
| 6,411,899 | B2 | 6/2002 | Dussell et al. |

(Continued)

OTHER PUBLICATIONS

Fitzgerald, Frank; Kawa, Mike; Riter, Joseph G.; Kiowa Warrior Control and Display System Development for Task Force XXI; American Helicopter Society 53rd Annual Forum; Apr. 29-May 1, 1997; American Helicopter Society, Inc.

*Primary Examiner*—Benjamin C. Lee
(74) *Attorney, Agent, or Firm*—McDonnell Buehnen Hulbert & Berghoff LLP (57) ABSTRACT

An embedded digitization system enables a military platform to receive, transmit and process a variety of types of information for a variety of purposes. An apparatus and method provides a means to ensure information interoperability between the invention and external sources. The invention provides a development environment that enables a developer to automatically and interactively develop the middleware services and functions that contain the aspects for interoperability with external sources. The invention ensures interoperability through reuse of functions and services known to satisfy requirements for interoperability. When functions and services that satisfy requirements for interoperability are not available, the invention provides a means to develop new functions and services that satisfy requirements for interoperability. The new functions and services are then added to those functions and services known to satisfy requirements for interoperability, and are also made available for use in future applications.

6 Claims, 10 Drawing Sheets

EMBEDDED DIGITIZATION SYSTEM 100

U.S. PATENT DOCUMENTS 6,429,812 B1* 8/2002 Hoffberg .................. 342/357.1
6,498,791 B2* 12/2002 Pickett et al. ............... 370/353
2006/0015674 A1* 1/2006 Murotake .................... 711/101

* cited by examiner

BUILD MIDDLEWARE COMPONENTS 700

BUILD INTEROPERABILITY COMPONENTS - DETAILED 900

FIG-9

EMBEDDED DIGITIZATION SYSTEM

CROSS-REFERENCE TO RELATED APPLICATIONS

This is a continuation-in-part of application Ser. No. 09/590,085, filed Jun. 7, 2000, now U.S. Pat. No. 6,765,498 granted on Jul. 20, 2004, entitled "EMBEDDED DIGITIZATION SYSTEM", the teachings of which are incorporated herein by reference.

BACKGROUND OF THE INVENTION

1. Field of the Invention (Technical Field)

The invention relates to the field of digitization equipment for military platforms and more particularly to a method and apparatus for an embedded digitization system that reduces or eliminates the multiplicity of physical elements within the digitization equipment. The invention further relates to the field of network centric warfare based on a system of interoperable systems where systems are comprised of digitization equipment.

2. Background Art

Relevant activities in the field are being carried out by the United States Army and its contractors in an effort to "digitize the Army," which is an effort to integrate digital message communications with existing and new Army platforms. Digital message communications occur within a theatre of operation over wire and wireless local area networks joined through wireless wide area networking, creating a "tactical Internet." The concept of military platforms interacting through digital message communications within a tactical internet, which spans a theatre of operation, is referred to as the "digital battlefield." The problems with the existing systems are functional problems whether mechanical, electrical, thermal, labor required, performance sought, etc. In addition, each platform usually has its own separate mission processors, time and position location/navigation processors, modem processors, and radio communications devices, making these elements redundant. The use of the prior art redundancy of elements increases the cost and weight of the system and decreases the reliability of the entire system.

The state of the art includes the integration of multiple pieces of equipment, referred to as "digitization equipment," onto a military platform to provide the platform with the capabilities required to communicate digital messages on a tactical internet. A military platform with digitization equipment is referred to as a "digitized platform." Each piece of digitization equipment on the digitized platform provides a unique portion of the required digital communications capabilities. However, each piece of digitization equipment typically includes similar physical elements like processing resources, memory resources, power supplies, communications devices, enclosures and physical interfaces. Thus, digitization equipment includes a multiplicity of similar physical elements. The disadvantage of the present system is that the cost and weight of digitization equipment is larger than necessary due to multiplicity of physical elements within the digitization equipment.

The present invention solves the problems of the prior art systems by embedding and integrating the capabilities required for digital message communications and mission processing into a system with singular instances of processing resources, memory resources, power supplies, communications devices, enclosures and physical interfaces.

The OH-58D Kiowa Warrior platform digitization equipment is an example of one of these prior art systems. Digitization equipment for this platform includes a multiplicity of similar physical elements within its mission processors, time and position location/navigation processor, modem processor, and radio communications devices.

A related technology is embodied in U.S. Pat. No. 5,883,586 Embedded Mission Avionics Data Link System. Whereas the referenced patent describes the embedding of digitization equipment into a platform with multiplicity of similar physical elements, the present invention describes embedding of digitization equipment into singular instances of physical elements.

SUMMARY OF THE INVENTION
(DISCLOSURE OF THE INVENTION)

Disclosed herein is an embedded digitization system with a single source for communicating within a platform and with other platforms, thereby eliminating the multiplicity of physical elements in the various devices. The preferred embedded digitization apparatus for integrating digital message communications with at least one platform comprises a single source for sending and receiving digital messages comprising exchanging information between predetermined platform applications. The preferred single source comprises a processor module. The single source can further comprise a configurable radio module, a time and position module, mass memory module and an input/output module. The preferred predetermined applications comprise at least one mission application, a time, position and navigation application, a digital messaging application, at least one weapon application and a user interface application.

In another embodiment, disclosed is a single embedded digitization apparatus for integrating digital message communications with at least one platform comprising a processor module, a time and position module, and a configurable radio module. The preferred time and position module comprises an inertial navigation sensor module and can also comprise a global positioning system (GPS) receiver. The preferred inertial navigation sensor module comprises an apparatus for detecting an angular position and rate of change of the angular position about its three Cartesian axes and detecting acceleration along its Cartesian axes. The aforementioned modules can comprise a single module. The preferred apparatus can further comprise an input/output module. The input and output module can comprise a general purpose interface module comprising at least one output interface for a display, at least one input interface for a point and click apparatus and interfaces for predetermined associated equipment. The associated equipment comprises radios, antennae, weapons delivery systems, at least one user output, at least one user input and at least one sensor. The configurable radio transmission module comprises software controlled communication protocols. The software controlled communication protocols comprise physical layer protocols, data link layer protocols, network layer protocols, transport layer protocols, modulation protocols, waveform protocols, transmission security protocols and communication security protocols.

Also disclosed is an apparatus for sending and receiving digital messages between military platforms comprising a single processing resource, a single memory resource, a single power supply and a single communication resource.

The preferred method for communicating digital information from a single source in at least one platform comprises the steps of communicating with a predetermined application and exchanging specific digital information from the communication between a digital messaging application and at least one specific application. The step of exchanging comprises transmitting the specific digital information. The step of exchanging also comprises extracting the specific digital information from the at least one specific application and creating a specific digital message and transmitting the specific digital message. The step of exchanging comprises receiving the specific digital information. The step of exchanging also comprises extracting the specific digital information from at least one digital message. The preferred method further comprises the step of providing the extracted digital information to the at least one specific application. The digital message can also comprise an external source.

The primary objects of the present invention are to enable a military platform to receive, transmit and process a variety of types of information for a variety of purposes. This information is exchanged between digitized platforms and other systems over a tactical internet or other communications interface.

The primary advantages of the present invention are that cost and weight of digitization equipment for digitized platforms are reduced while the reliability of digitization equipment is increased. These advantages are realized because as few as one piece of equipment can provide all digitization equipment capabilities for a digitized platform.

The invention exchanges information with an external source using methods of communication well understood by those skilled in the art. These methods enable the invention and external sources to be developed and implemented independent of each other, as long as each source adheres to compatible methods of information exchange. When the invention and external sources are able to exchange information with each other, they are said to be "interoperable," although only in a minimal sense when using obvious methods and means of information exchange.

However, the desire of the military to conduct network centric operations through a networked system of systems requires a higher standard of interoperability. This higher standard of interoperability extends beyond the need to simply exchange information, and now includes the need to manage the quality of the exchange, the authenticity of the information exchanged and source of the information, the integrity of the information, the availability of the information, and the type of information exchanged between applications within the invention as well as the type of information exchanged between the invention and external sources. Managing the type of information exchanged helps to ensure that only relevant information in a useable form is exchanged, thus helping to manage the amount of bandwidth and processing needed for the exchange of information. In order to provide the higher standard of interoperability, the preferred embodiment of the invention includes a means for information and network management.

Information and network management can be embodied in software known as "middleware" that provides services and functions used by application software. Generally, middleware is that software that resides at a level of abstraction between application software and operating system and services software, and otherwise extends the capabilities of operating system and services software in the form of services available for use by applications. Operating system and services software enables exchange of information specifically for those applications that physically reside with the operating system and services software. An example of middleware that extends the capabilities of operating system and services software is the common object request broker (CORBA). CORBA enables applications to exchange information with each other in the form of software objects. Using CORBA, one can design an application that exchanges software objects with other applications without prior knowledge of where the other applications physically or virtually reside. By way of extension, middleware that includes information and network management can enable applications to exchange information throughout a system or system of systems without prior knowledge of where applications physically or virtually reside.

Also influencing the preferred embodiment of the invention is the need by the military and associated industrial base to reduce costs associated with developing means for each type of source to provide the higher standard of interoperability. Therefore, the preferred embodiment of the invention includes a common means for information and network management that provides the higher standard for interoperability, where the common means provides the higher standard for interoperability for a multiplicity of sources, and thus reducing to one the number of means that must be developed for said multiplicity of sources, and thus reducing the total costs required to provide interoperability amongst the multiplicity of sources.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
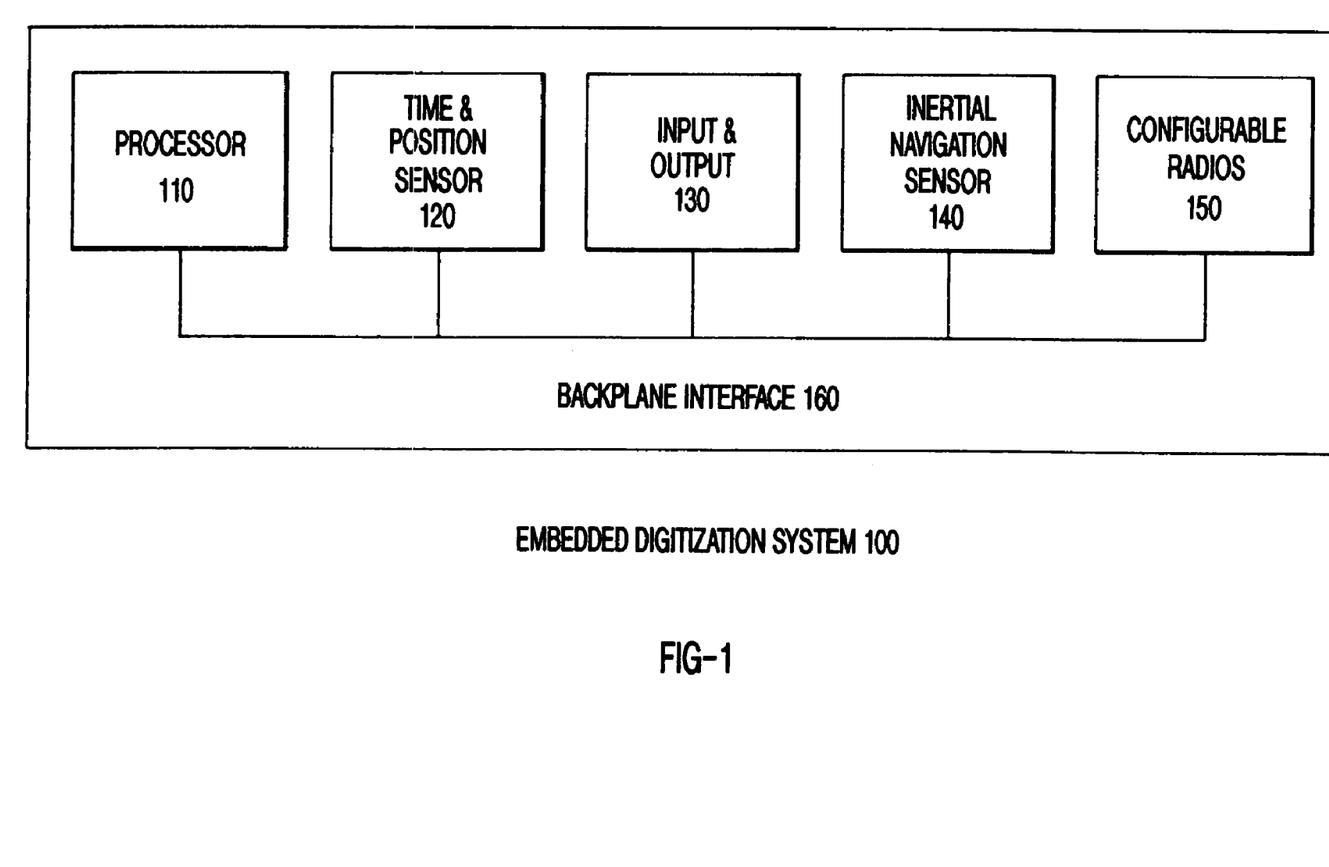
FIG. 1 is a block diagram of the preferred digitized platform.

The present invention provides an apparatus, system, and method for an embedded digitization system. Disclosed in FIG. 1 is a block diagram of a digitized platform 300. The system includes the invention, which is an embedded digitization system (EMBEDDED DIGITIZATION SYSTEM) 100, which enables the system to receive, transmit, and process a variety of types of information for a variety of purposes. The system also includes associated equipment and systems (ASSOCIATED EQUIPMENT) 200 which is controlled by the invention and enables the system to perform functions in addition to those directly performed by the invention.

In the preferred embodiment of the invention as shown in FIG. 1, a single instance each of processor module 110, time and position sensor module 120, input and output module 130, inertial navigation sensor module 140 and configurable radio module 150 are embedded in the invention to minimize the cost and weight of the invention while increasing the reliability of the invention. For digitized platforms 300 which do not require highly accurate attitude, position, and motion information, inertial navigation sensor 140 may be removed to further reduce cost and weight of the invention. For digitized platforms 300 with minimal input and output interface requirements, input and output module 130 may be combined with other modules in the invention to reduce cost and weight of the invention.

Figure 2:
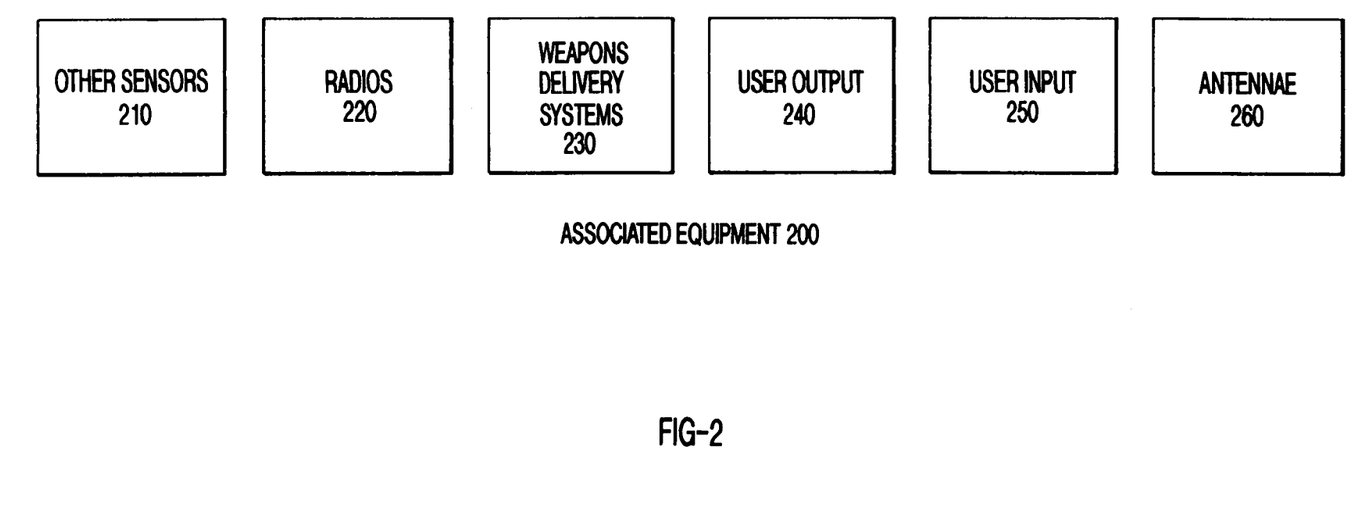
FIG. 2 is a block diagram of the preferred embedded digitization system.

Disclosed in FIG. 2 is a block diagram of the invention, an embedded digitization system 100. Embedded in the invention is one or more processor modules (PROCESSOR) 110 which process all information for the system, a time and position sensor module (TIME & POSITION SENSOR) 120 which senses time and the geospatial position and direction of the invention one or more input and output modules (INPUT & OUTPUT) 130 which provide interfaces between the invention and other associated equipment and systems, an inertial navigation sensor (INERTIAL NAVIGATION SENSOR) 140 which senses the geospatial attitude, position, and motion of the invention, configurable radio modules (CONFIGURABLE RADIOS) 150 which enable the system to transmit and receive information, an inter-module interface (INTER-MODULE INTERFACE) 160 which provides a means for modules and sensors in the invention to share information with each other, and external interfaces (EXTERNAL INTERFACES) 170 which provides a means for the invention to share information with other systems and sub-systems.

In FIG. 2, processor module 110 is a general purpose processor with program memory, general purpose memory, a clock, and timers; time and position sensor module 120 is a global positioning system (GPS) receiver; input and output module 130 is a general purpose interface module which includes output interfaces for a display, input interfaces for a computer mouse (point and click device), and other interfaces for other associated equipment 200; inertial navigation sensor module 140 detects the angular position and rate of change of the angular position about its three Cartesian axes and detects acceleration along its Cartesian axes; configurable radio module 150 is a radio capable of transmitting and receiving on software controlled radio frequencies using communication protocols implemented in software including physical layer protocols, data link layer protocols, network layer protocols, and transport layer protocols, where layers are defined by the open systems interconnection (OSI) model and protocols are defined by a tactical internet; inter-module interface 160 is a high speed interface like IEEE-1394; external interfaces 170 are interfaces to associated equipment 200.

Figure 3:
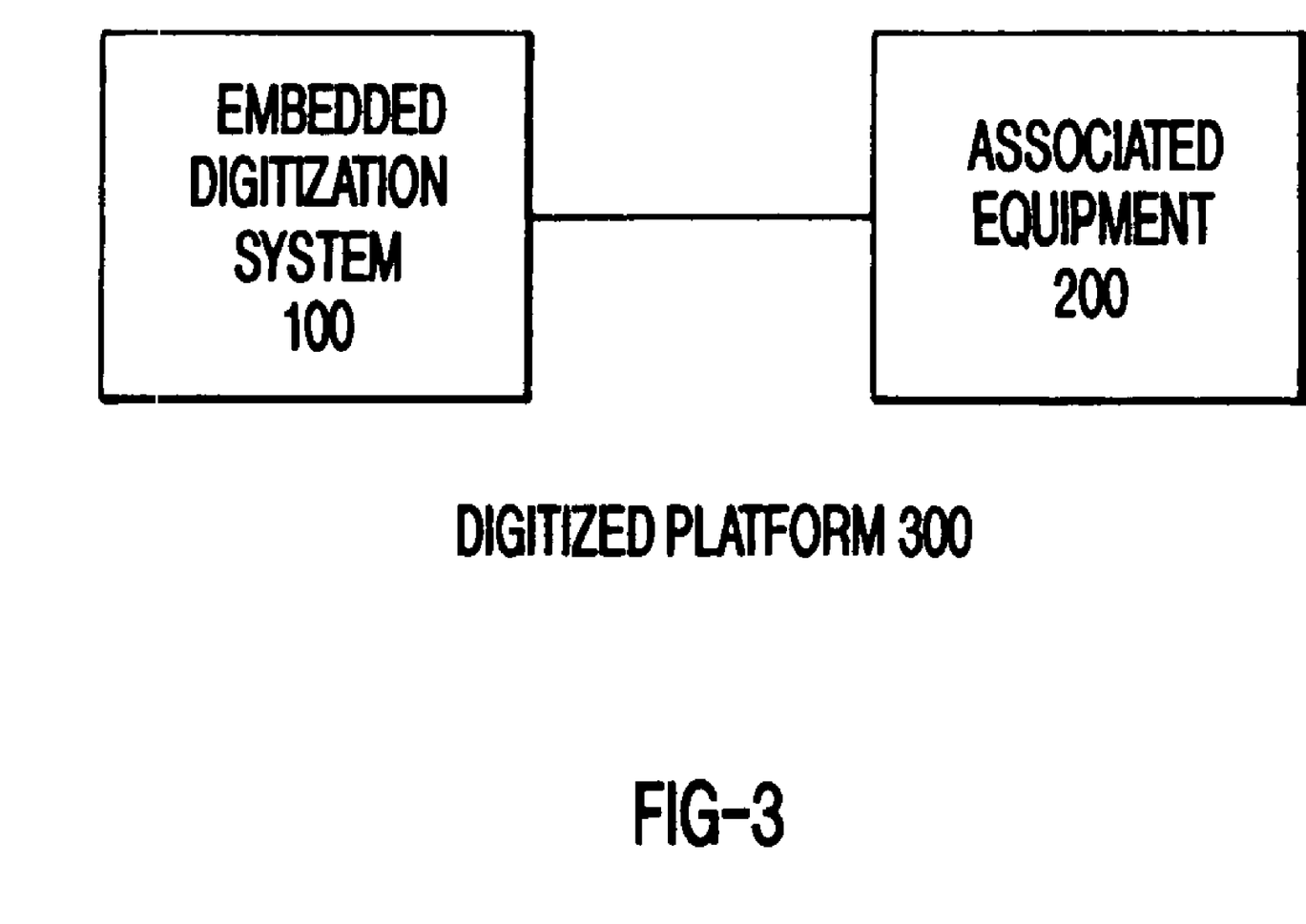
FIG. 3 is a block diagram of typical associated equipment used with the preferred invention.

FIG. 3 is a block diagram of the associated equipment and systems 200. Included in associated equipment and systems are radios (RADIOS) 220 which enable the system to transmit and receive information, antennae (ANTENNAE) 260 for the radios in the system, weapons delivery systems (WEAPONS DELIVERY SYSTEMS) 230 which enable the system to deliver weapons to targets, user output devices (USER OUTPUT) 240 which provide users of the system with visual information regarding the state of the system and its surroundings, user input devices (USER INPUT) 250 which provide users of the system with a means for entering information into the system and controlling the system, and sensors (OTHER SENSORS) 210 which enable the system to sense information in addition to that sensed by the invention in the system or received by the radios in the system or entered by the users of the system.

Figure 4:
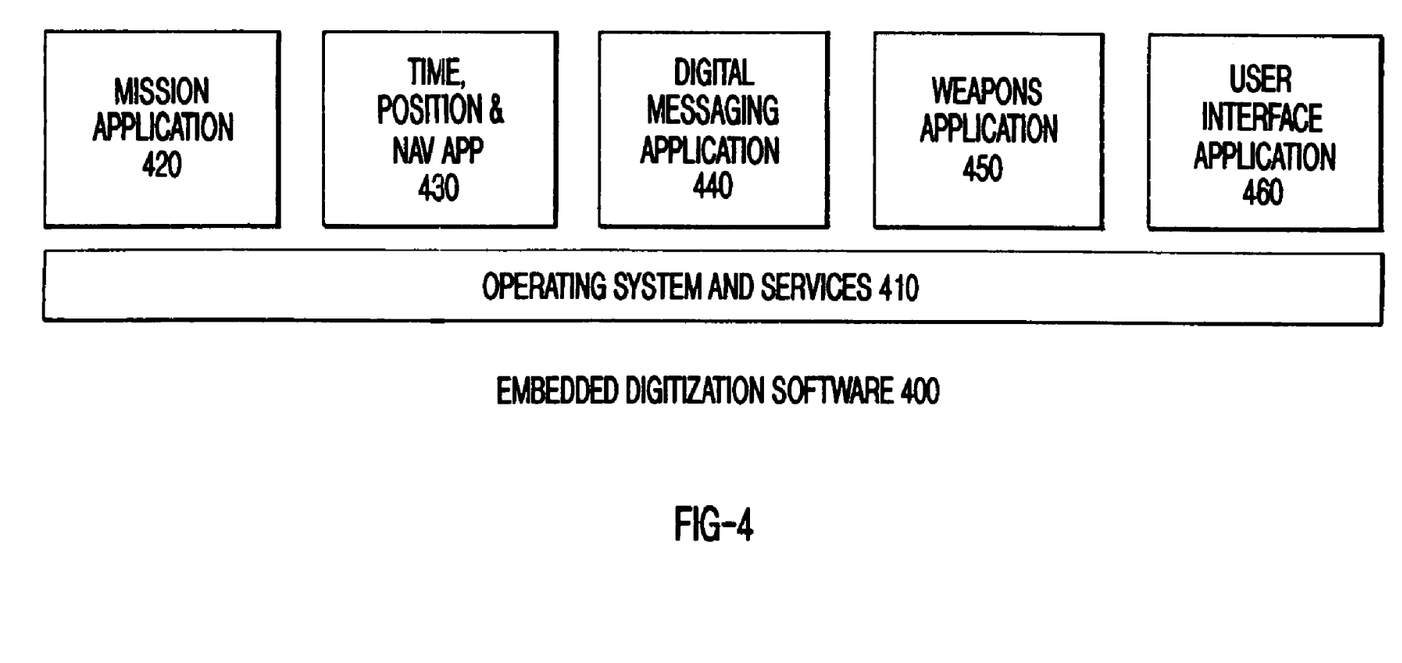
FIG. 4 is a block diagram of the preferred embedded digitization software.

FIG. 4 is a block diagram of the embedded digitization software (EMBEDDED DIGITIZATION SOFTWARE) 400, which is executed by the processor or processors 110. The mission application (MISSION APPLICATION) 420 carries out the following tasks:

provides system functions and services for the invention;
uses information provided by other applications in the invention;
controls other applications in the invention;
uses information provided by modules in the invention;
controls hardware in the invention;
uses information provided by associated equipment 200 on the digitized platform 300;
controls associated equipment 200 on the digitized platform 300;
performs built in tests of the invention;
provides functions and services unique to the digitized platform 300; and
performs other tasks as required.

Also disclosed in FIG. 4 is a user interface application (USER INTERFACE APPLICATION) 460, which provides the graphics, text, other visual or audible enunciation, and functions for a user interface. The user interface application 460 is optional in the invention, enabling the invention to be used as an autonomous system or on unmanned digitized platforms 300. The user interface application 460 supports user input 250 like keyboards, pointing devices, switches, touch-screens, head-tracking sensors, eye-tracking sensors, other sensors, interfaces to other applications in the invention, and other input devices. The user interface application 460 supports user output 240 like displays, communication devices, lights, sound devices, interfaces to other applications in the invention, and other output devices.

FIG. 4 also shows a time and position and attitude and navigation application (TIME, POSITION & NAV APP) 430, which computes the time, attitude, position, and motion solution for the digitized platform 300. The time and position and attitude and navigation application 430 uses information from the time and position sensor module 120, input and output module 130, and inertial navigation sensor module 140. When information from time and position sensor module 120 or inertial navigation sensor module 140 is degraded or lost, time and position and attitude and navigation application 430 can continue to periodically compute a time, attitude, position, and motion solution for the digitized platform 300 with graceful degradation in time, attitude, position, and motion solution accuracy.

A digital messaging application (DIGITAL MESSAGING APPLICATION) 440 which extracts information from digital messages received from a tactical internet, extracts information from digitization software 400 and puts the extracted information into digital messages to be transmitted on a tactical internet, processes information associated with received and transmitted digital messages, and implements communications protocols associated with a tactical internet is shown in FIG. 4. Also shown is a weapons application (WEAPONS APPLICATION) 450, which processes information associated with weapons delivery systems 230, and controls weapons delivery systems 230.

FIG. 4 also shows an operating system and services (OPERATING SYSTEM AND SERVICES) 410 which provide services and functions in support of the applications in the invention. Services and functions in the operating system and services 410 include memory protection, scheduling, process control, interfaces to hardware, and other services and functions for embedded software.

Figure 5:
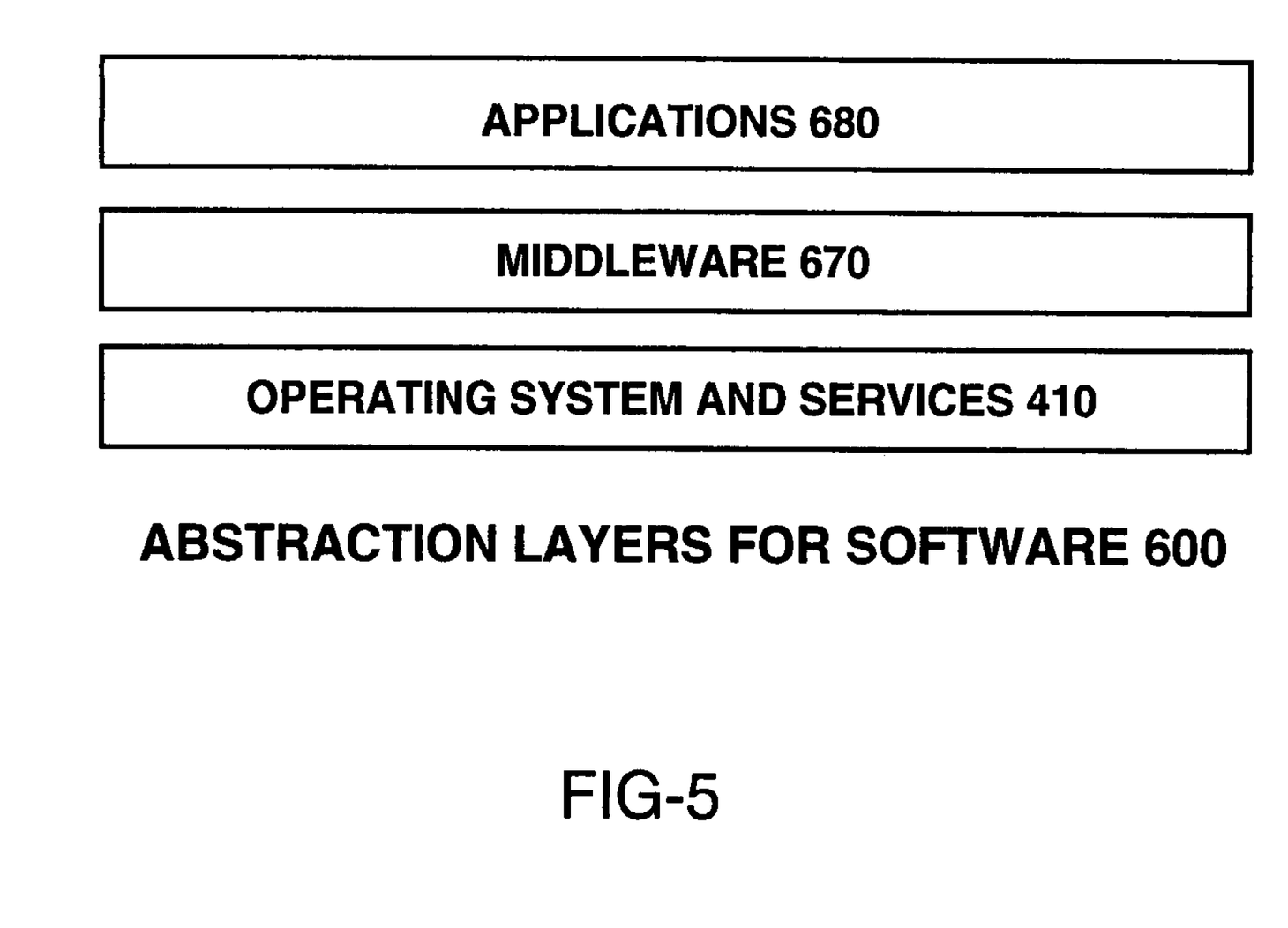
FIG. 5 is a block diagram of the preferred embedded digitization software with information and network management or middleware.

FIG. 5 (ABSTRACTION LAYERS FOR SOFTWARE) 600 illustrates the relationship in terms of level of abstraction between applications 680, middleware 670, and operating system and services 410, where applications are shown to be on top because they use the services from the layers below to provide higher value functions.

Figure 6:
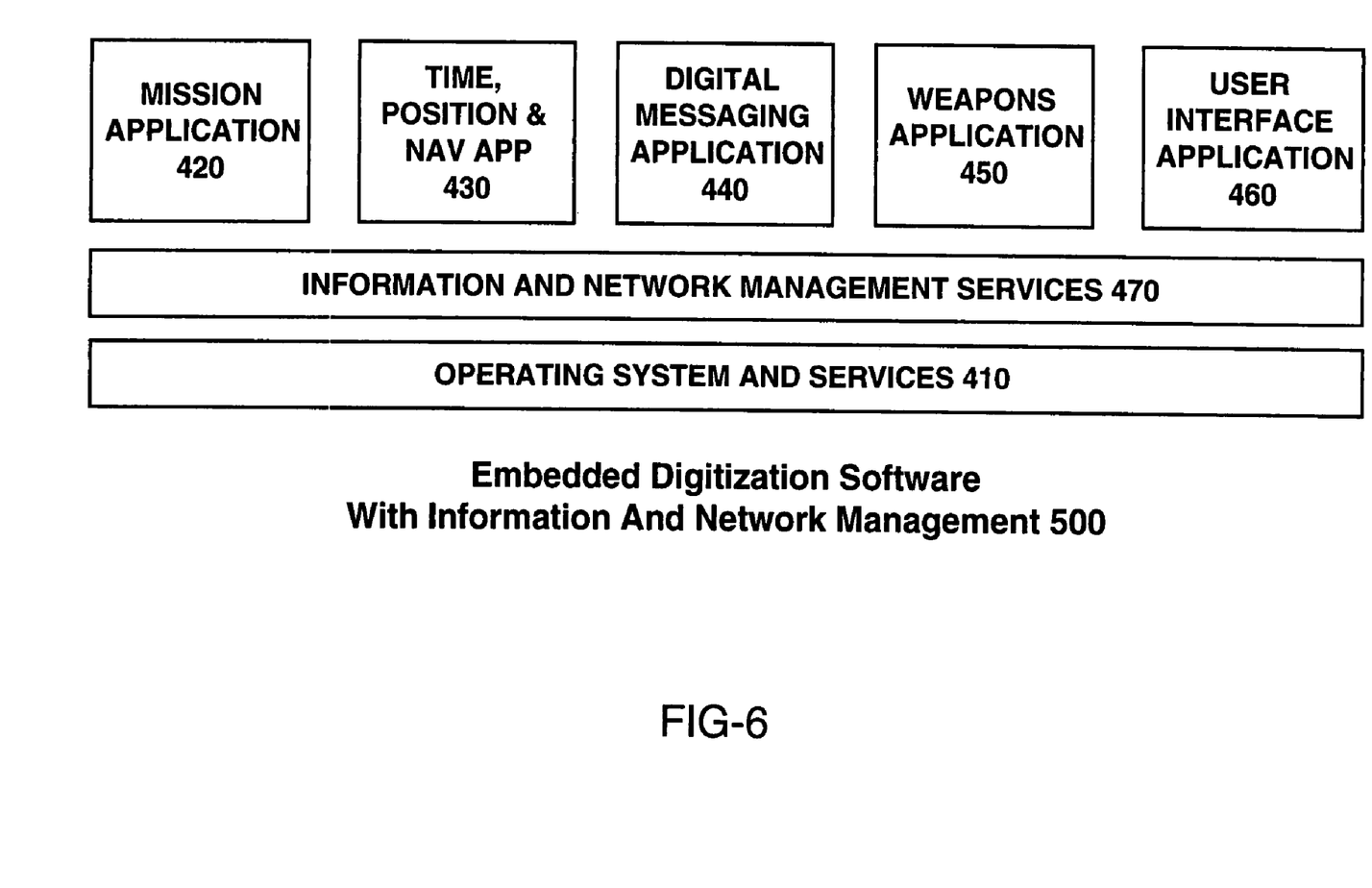
FIG. 6 is an alternative block diagram of the embedded digitization software of FIG. 4.

FIG. 6 is an alternate block diagram (EMBEDDED DIGITIZATION SOFTWARE WITH INFORMATION AND NETWORK MANAGEMENT) 500 to FIG. 4 showing information and network management services 470 integrated as middleware within the embedded digitization software 400 and executed by the processor or processors 110. Information and network management services 470, is a particular instantiation of middleware 670. Information and network management services 470 includes services and functions to manage quality of service in the exchange of information between applications embedded in the invention, manage quality of service in the exchange of information between the invention and external sources, authenticate information exchanged between applications, authenticate information received by the invention, add authenticating attributes to information transmitted by the invention, manage the integrity of information exchanged between the invention and external sources, manage communication protocol settings in order to maximize availability of information, manage which types of information are exchanged between applications embedded in the invention, and manage which types of information are exchanged between the invention and external sources.

It is preferred that information and network management services 470 are common with those implemented in external sources in order to ensure that the highest level of interoperability between the invention and external sources, and to reduce system and system of systems costs through higher degrees of implementation reuse. As a minimum, the services and functions that are implemented for information and network management in external sources must be compatible with the implementation for information and network management services 470.

Figure 7:
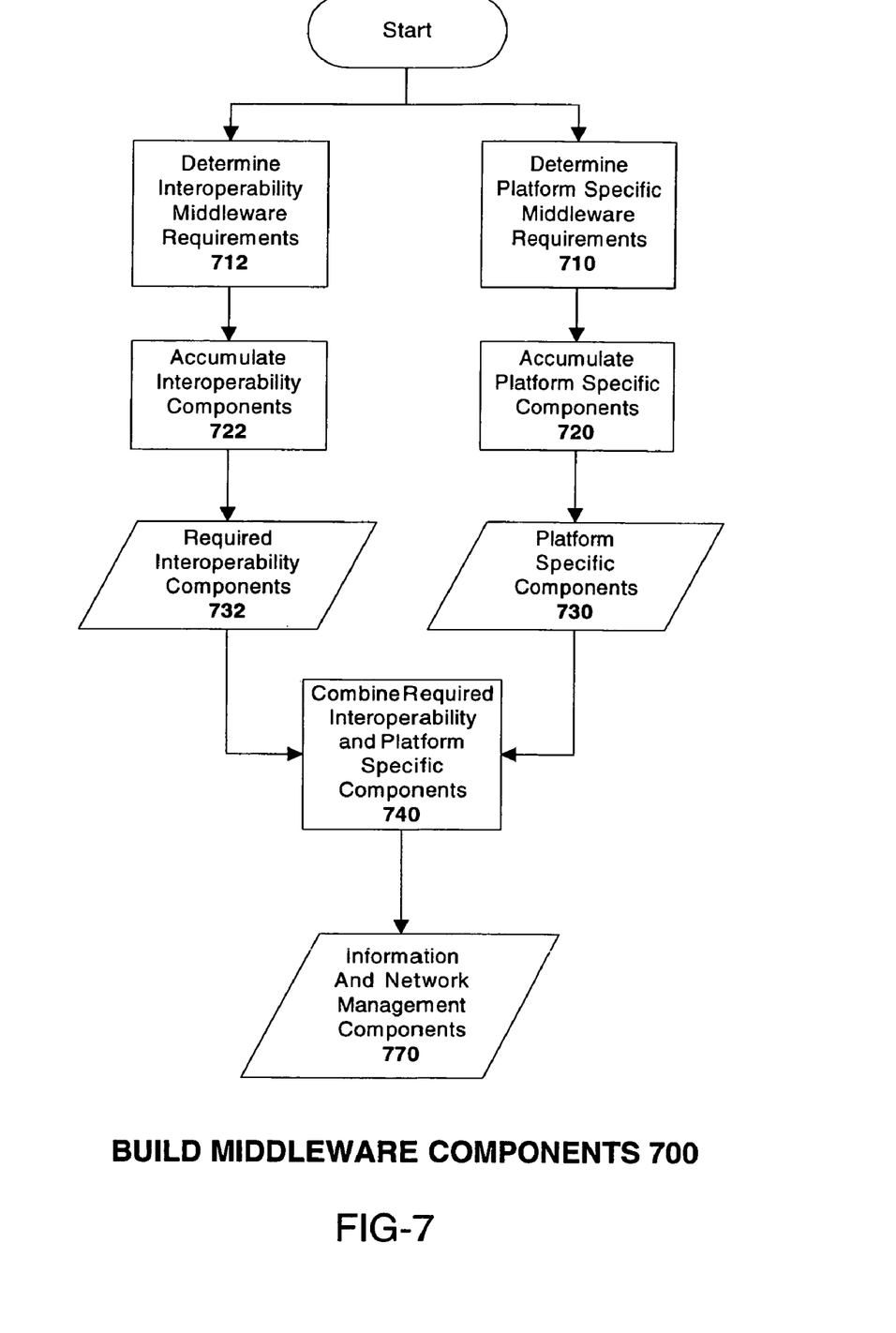
FIG. 7 is a flowchart that illustrates how the components are combined to build the middleware.

FIG. 7 (BUILD MIDDLEWARE COMPONENTS) 700 illustrates how information and network management components 770, which includes the components that form information and network management services 470, is built. Platform specific components are those needed for information and network management services 470 that are unique to the invention and otherwise do not contribute to the interoperability of the invention with external sources. Middleware requirements for interoperability and platform specific needs are determined in the steps determine interoperability middleware requirements 712 and determine platform specific middleware requirements 710, respectively. Then components for middleware are accumulated in the steps accumulate interoperability components 722 and accumulate platform specific components 720. The outputs from these steps, required interoperability components 732 and platform specific components 730, are combined in the step combine required interoperability and platform specific components 740 to form information and network management components 770.

Figure 8:
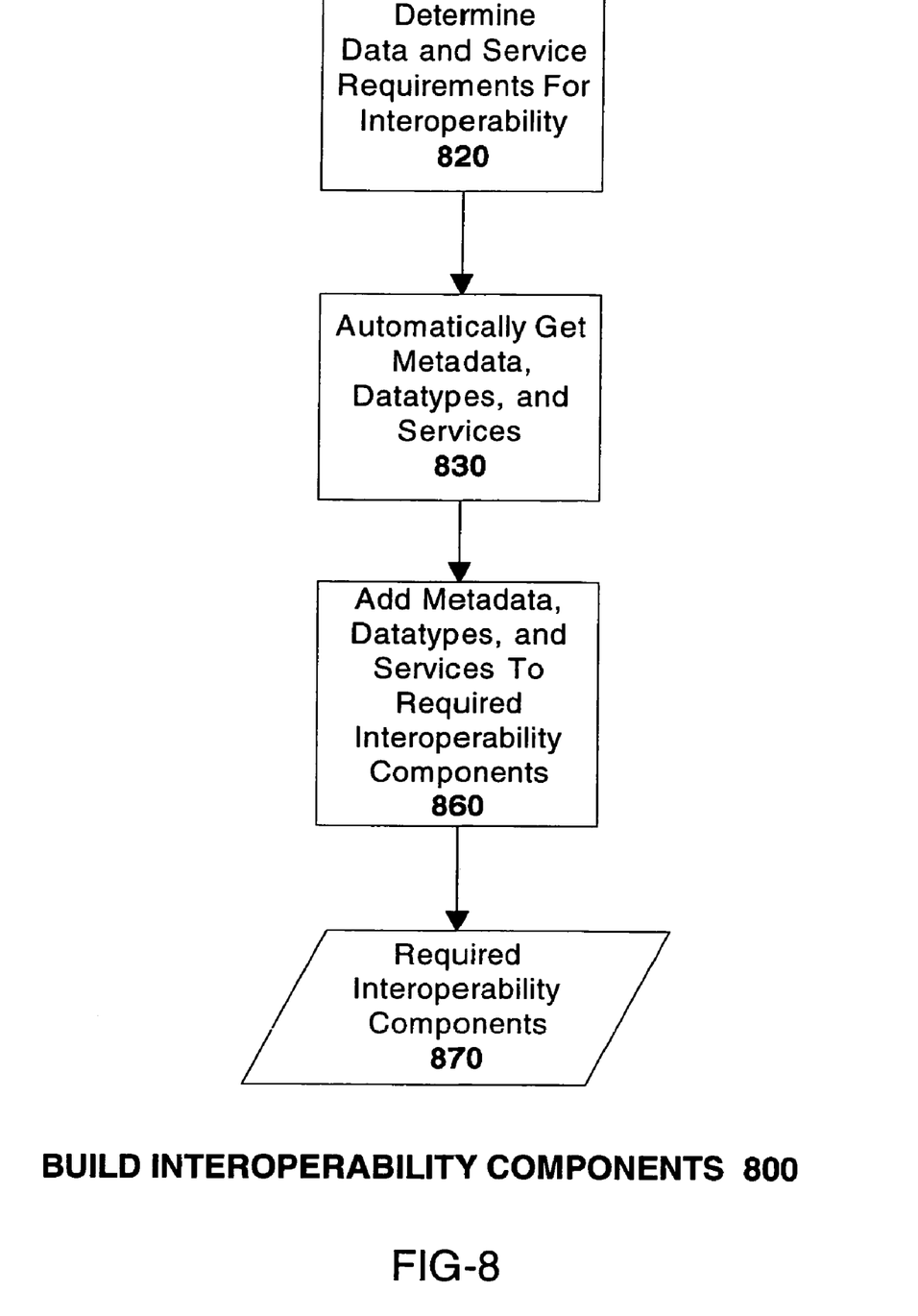
FIG. 8 shows the preferred method and components for building the interoperability in information and network management services.

FIG. 8 (BUILD INTEROPERABILITY COMPONENTS) 800 illustrates how the components for interoperability in information and network management services 470 are built using a method whereby the design process is substantially automated and interactive, and whereby the same automation ensures that interoperability requirements are satisfied. The step determine data and service requirements for interoperability 820 is a more specific form of the step determine interoperability middleware requirements 712, where the developer of information and network management services 470 for the invention is discovering data and service requirements for interoperability. The automation in the step automatically get metadata, datatypes, and services 830 is important because it provides the means and enforces the rule to reuse available interoperability components, eliminating the variance in quality of interoperability and eliminating the costs associated with developing new components to provide the invention with interoperability with external sources. Then the step add metadata, datatypes, and services to required interoperability components 860 yields required interoperability components 870, which are those components of information and network management services 470 required for interoperability of the invention with external sources. These components are said to be required because they satisfy interoperability requirements, while their reuse constitutes the elimination of the need to develop new components that otherwise provide a similar capability.

Figure 9:
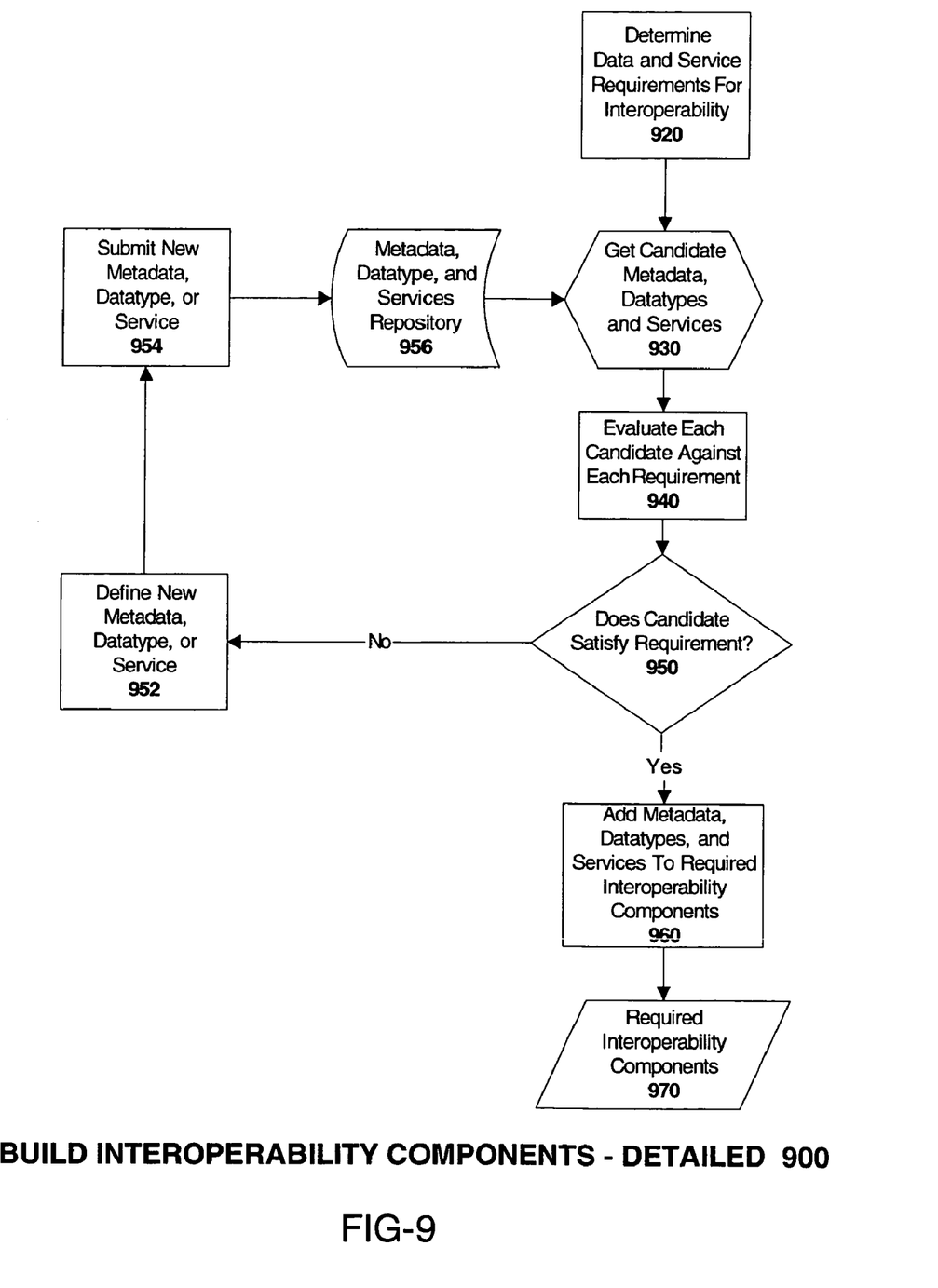
FIG. 9 is a flow chart providing additional detail to the embodiment of FIG. 8 on how the step to automatically get metadata, datatypes, and services is accomplished.

FIG. 9 (BUILD INTEROPERABILITY COMPONENTS—DETAILED) 900 illustrates the same method shown in FIG. 8, but provides additional detail on how the step to automatically get metadata, datatypes, and services 830 is accomplished. To accomplish this step, candidate interoperability components are automatically obtained in the step get candidate metadata, datatypes and services 930. Attributes of each candidate interoperability component is compared to the data and service requirements for interoperability in the steps, evaluate each candidate interoperability component against each requirement 940, where satisfaction of interoperability requirements is tested in the step, does candidate satisfy requirement? 950. If a candidate interoperability component satisfies interoperability requirements, the next step, add metadata, datatypes, and services to required interoperability components 960 is performed.

If a candidate interoperability component does not satisfy interoperability requirements, a new component is defined and submitted in the steps, define new metadata, datatype, or service 952 and submit new metadata, datatype, or service 954, successively. The new component is then placed into metadata, datatype, and services repository 956, where the new component becomes available for future consideration as a candidate interoperability component.

The step, determine data and service requirements for interoperability 920, is the same as the step determine data and service requirements for interoperability 820. The step, add metadata, datatypes, and services to required interoperability components 960, is the same as the step, add metadata, datatypes, and services to required interoperability components 860. The output, required interoperability components 970, is the same as the output required interoperability components 870.

Figure 10:
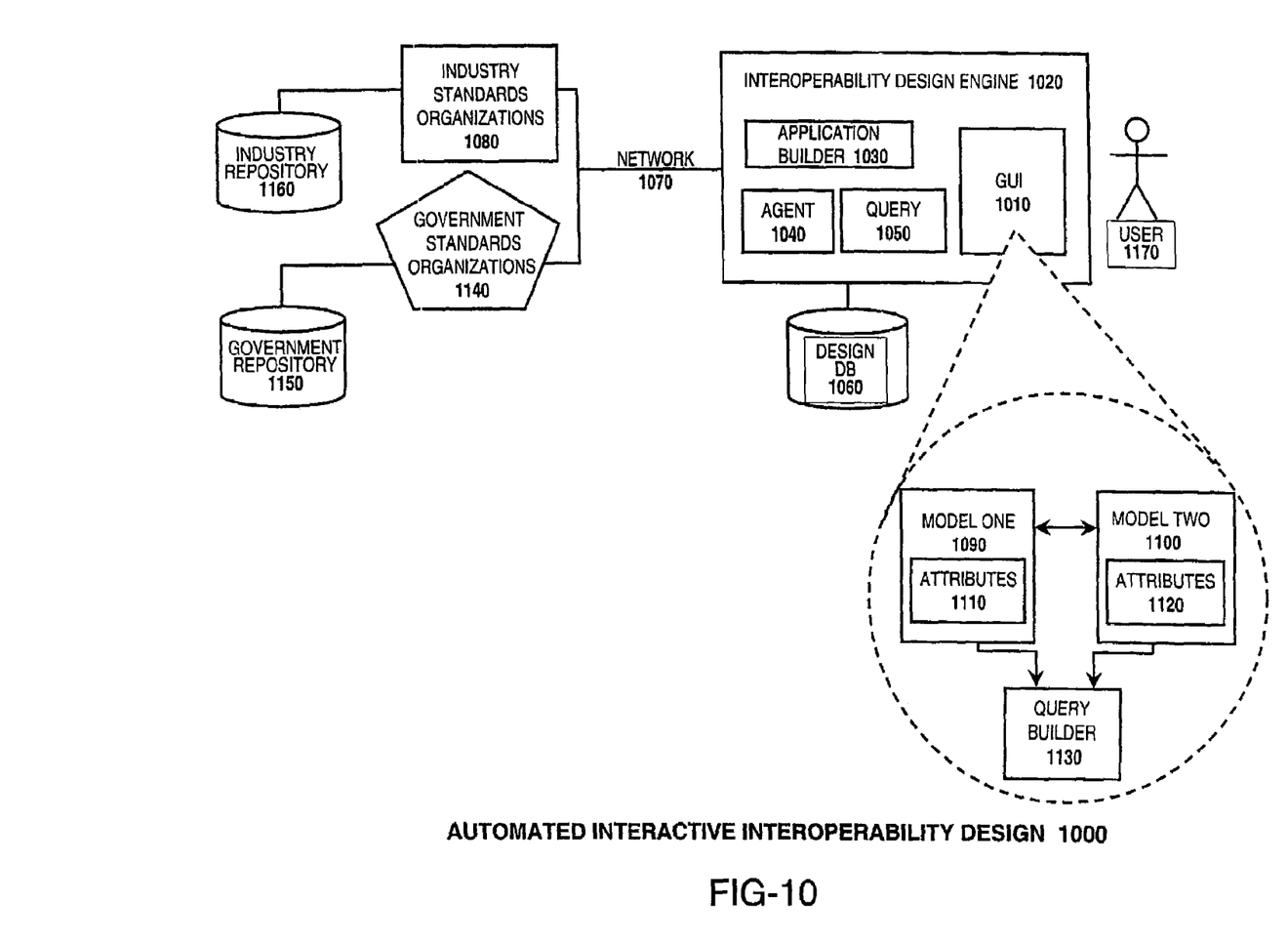
FIG. 10 illustrates an operational concept for a means to design and develop the preferred embodiment and its information and network management services.

FIG. 10 (AUTOMATED INTERACTIVE INTEROPERABILITY DESIGN) 1000 illustrates an operational concept for a means to design and develop the invention and its information and network management services 470. The operational concept provides a user 1170 with an interoperability design engine 1020 that is connected through a network 1070 to industry standards organizations 1080 and government standards organizations 1140. Industry standards organizations 1080 and government standards organizations 1140 have industry repository 1160 and government repository 1150, respectively, which contain components used in external sources, also known as interoperable components. When interoperable components are reused to build information and network management services 470, the invention is made interoperable with external sources.

The purpose of the interoperability design engine 1020 is to enable a user 1170 to automatically and interactively develop an invention that is interoperable with external sources. The interoperability design engine 1020 includes an interactive user interface manifested through GUI 1010 (graphical user interface) that enables the user 1170 to model the behaviors and performance for the invention in model one 1090 and the behaviors and performance for one or more external sources in model two 1120. The underlying modeling and simulation capability necessary to model behaviors and performance is provided by application builder 1030. Behaviors and performance that are modeled include those for establishing interoperability between the invention and one or more external sources. The artifacts of the design for model one 1090 and one or more external sources in model two 1120 are contained in database 1060. An important part of the invention in model one 1090 and one or more external sources in model two 1120 is attributes 1110 and attributes 1120, respectively. In general, attributes are the information indicating the desired behaviors and performance for an invention or external source under development, or the observed behavior and performance for an invention or external source that has already been developed.

The user 1170 uses query builder 1130, with capabilities provided by query 1050 and manifested as a part of GUI 1010, to interactively build queries for interoperable components for model one 1090 and model two 1100. Queries are automatically populated with attributes 1110 and attributes 1120 by query 1050. Agent 1040 communicates over network 1070 to automatically search and query industry standards organizations 1080 and government standards organizations 1140 in accordance with the queries provided by query 1050. Agent 1040 provides interoperable components that are returned over network 1070 to application builder 1030. Application builder 1030 then automatically updates model one 1090 and/or model two 1100 with the appropriate interoperable components by automatically updating database 1060.

When a query can not be satisfied with available interoperable components, application builder 1030 provides user 1170 with a means to create a new component and associated attributes, which become a part of model one 1090 and/or model two 1100. The user 1170 uses query builder 1130 to interactively build a request for consideration of the new component and associated attributes by industry standards organizations 1080 and government standards organizations 1140 in order to extend the complement of interoperable components. The request for consideration is automatically populated with attributes 1110 and/or attributes 1120 by query 1050. Agent 1040 communicates over network 1070 to automatically submit the request for consideration to industry standards organizations 1080 and/or government standards organizations 1140 in accordance with the request for consideration provided by query 1050.

Modules could be combined in a number of ways, including into a single module. Processor module 110 can include a single processor or multiple processors on a single or multiple modules. Time and position sensor module 120 is optional, as not all digitized platforms 300 require time and/or geospatial position and/or direction determination. Input and output module 130 is optional, as interfaces can be included on other modules in the invention. Inertial navigation sensor module 140 is optional, as not all digitized platforms 300 require geospatial attitude, position, and motion determination. Configurable radios module 150 is optional, as some digitized platforms 300 have legacy and/or external radios or communicate over interfaces other than radio interfaces. Other modules can be added to the invention to extend the capabilities of the invention and/or enhance the performance of the invention. The time and position and navigation application is 430 optional, as a digitized platform 300 may not have a time and position sensor module 120 and/or a inertial navigation sensor module 140. The weapons application 450 is optional, as a digitized platform 300 may not be a weapons platform or may have legacy or alternate means for controlling its weapons. The user interface application 460 is optional, as a digitized platform 300 may have a legacy or alternate means for providing a user interface, or a digitized platform 300 may require autonomous digitization equipment.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

The invention claimed is:

1. An embedded digitization apparatus for integrating digital message communications onto a first platform, the apparatus comprising:
   at least two predetermined platform applications, said at least two predetermined platform applications comprising at least a communications application and a mission processing application;
   a single source for sending and receiving the digital message communications between the first platform and at least one external platform;
   said single source also for exchanging the digital message communications between said at least two predetermined platform applications; and
   said single source also comprising a means for information and network management services.

2. The embedded digitization apparatus of claim 1 wherein at least one information and network management component for said means for information and network management services is obtained from at least one external repository containing at least one information and network management component.

3. The embedded digitization apparatus of claim 2 wherein said at least one information and network management component is interoperable with said at lease one external platform.

4. The embedded digitization apparatus of claim 2 wherein said at least one information and network management component is substantially similar to the means for information and network management services that are part of said at least one external platform.

5. A method for exchanging digital information on a first platform, and at least two predetermined platform applications, the at least two predetermined platform applications comprising at least a communications application and a mission processing application, the method comprising:
   providing a single source for integrating the digital information for the first platform;
   sending the digital information from the single source to the at least one external platform and sending the digital information from the at least one external platform to the single source;
   exchanging the digital information from the single source at least between the communication application and the mission processing application; and
   providing information and network management services from the single source.

6. The method of claim 5 wherein providing information and network management services further comprises:
   managing quality of service during the exchange of the digital information between the at least two platform applications, and between the single source and the at least one external platform;
   authenticating the digital information exchanged between the at least two platform applications, and between the single source and the at least one external platform;
   authenticating the digital information received by the single source;
   adding authenticating attributes to the digital information sent by the single source;
   managing an integrity of the digital information exchanged between the at least two platform applications, and between the single source and the at least one external platform;
   managing communication protocol settings for the single source to maximize availability of the digital information; and
   managing which types of digital information are exchanged between the at least two platform applications, and between the single source and the at least one external platform.

* * * * *